United States Patent
Griffin, Jr.

(10) Patent No.: US 7,647,129 B1
(45) Date of Patent: Jan. 12, 2010

(54) DIGITAL MUSIC PLAYER ACCESSORY INTERFACE

(75) Inventor: Paul P. Griffin, Jr., Nashville, TN (US)

(73) Assignee: Griffin Technology, Inc., Nashville, TN (US)

( * ) Notice: Subject to any disclaimer, the term of this patent is extended or adjusted under 35 U.S.C. 154(b) by 490 days.

(21) Appl. No.: 11/286,610

(22) Filed: Nov. 23, 2005

(51) Int. Cl.
H06F 17/00 (2006.01)

(52) U.S. Cl. .......................... 700/94; 710/303; 710/304

(58) Field of Classification Search .................... 700/94
See application file for complete search history.

(56) References Cited

U.S. PATENT DOCUMENTS

| | | | |
|---|---|---|---|
| 6,236,938 B1 * | 5/2001 | Atkinson et al. ............. | 701/214 |
| 6,240,297 B1 | 5/2001 | Jadoul | |
| 6,292,440 B1 | 9/2001 | Lee | |
| 6,396,769 B1 | 5/2002 | Polany | |
| 6,420,849 B2 | 7/2002 | Murphy | |
| 6,480,377 B2 * | 11/2002 | Genest et al. ................ | 361/686 |
| 6,591,085 B1 | 7/2003 | Grady .......................... | 455/42 |
| 6,657,654 B2 * | 12/2003 | Narayanaswami ....... | 348/14.04 |
| 7,197,584 B2 * | 3/2007 | Huber et al. .................. | 710/72 |
| 7,259,793 B2 * | 8/2007 | Manico et al. .............. | 348/373 |
| 7,292,881 B2 * | 11/2007 | Seil et al. .................. | 455/575.1 |
| 7,315,260 B1 * | 1/2008 | Lam et al. ..................... | 341/22 |
| 2002/0098813 A1 | 7/2002 | Likourezos et al. | |
| 2002/0155864 A1 * | 10/2002 | Wang .......................... | 455/566 |
| 2003/0003876 A1 * | 1/2003 | Rumsey ....................... | 455/74 |
| 2003/0021087 A1 * | 1/2003 | Lunsford ..................... | 361/686 |
| 2003/0033214 A1 * | 2/2003 | Mikkelsen et al. ............ | 705/26 |
| 2004/0221007 A1 * | 11/2004 | Roe et al. .................... | 709/203 |
| 2005/0047071 A1 * | 3/2005 | Tse Chun Hin ............. | 361/683 |
| 2006/0028479 A1 * | 2/2006 | Chun et al. ................. | 345/531 |
| 2006/0087936 A1 * | 4/2006 | Bart .......................... | 369/47.1 |
| 2006/0105722 A1 * | 5/2006 | Kumar ...................... | 455/90.3 |
| 2006/0116009 A1 * | 6/2006 | Langberg et al. ........... | 439/76.1 |
| 2006/0236014 A1 * | 10/2006 | Yin et al. .................... | 710/303 |
| 2007/0050061 A1 * | 3/2007 | Klein et al. ................... | 700/94 |
| 2007/0093264 A1 * | 4/2007 | Srinivasan et al. ....... | 455/556.1 |
| 2007/0093277 A1 * | 4/2007 | Cavacuiti et al. ............ | 455/566 |

OTHER PUBLICATIONS

GPS companion_en, Magellan Corporation, 2000.*

* cited by examiner

*Primary Examiner*—Curtis Kuntz
*Assistant Examiner*—Paul McCord
(74) *Attorney, Agent, or Firm*—Hornkohl Intellectual Property Law, PLLC; Jason L. Hornkohl

(57) ABSTRACT

An FM transmitter accessory for a digital music player having a display screen uses a microprocessor to create image files that are transferred to the digital music player such that they are displayed on its screen. When a user input on the accessory is manipulated on the accessory to select a transmission frequency for the FM transmitter, the microcontroller generates a new image file that corresponds to the selected frequency and transfers the generated image file to the digital music player such that the selected frequency is displayed on the screen of the digital music player. In addition, by constantly generating new displays based upon user inputs, the accessory can display menus on the screen of the digital music player that can be manipulated by user to select between a number of displayed options.

19 Claims, 9 Drawing Sheets

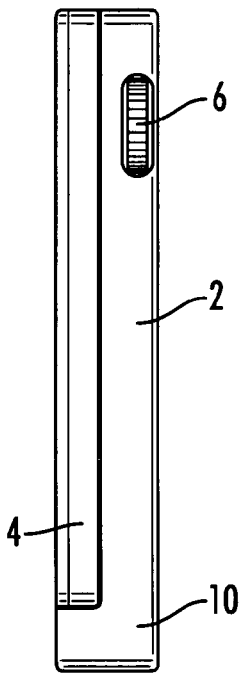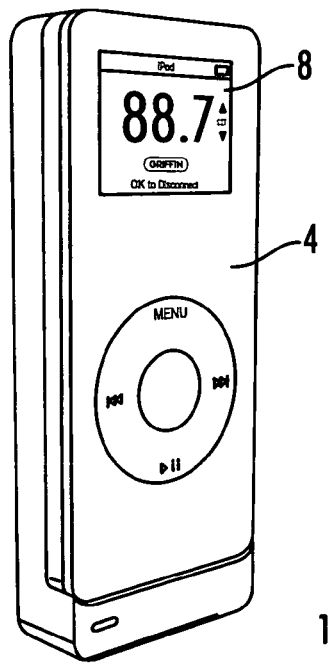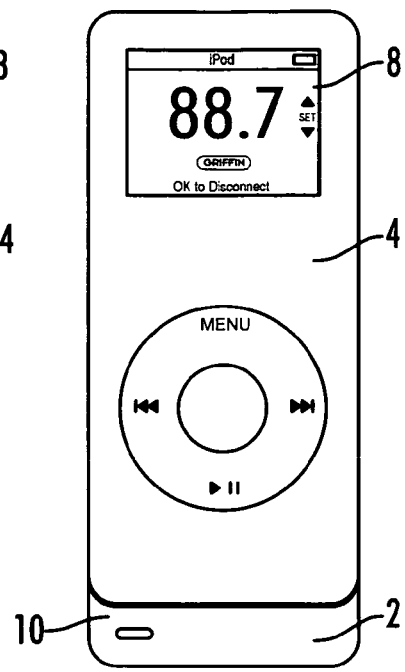
FIG. 1(a)   FIG. 1(b)   FIG. 1(c)
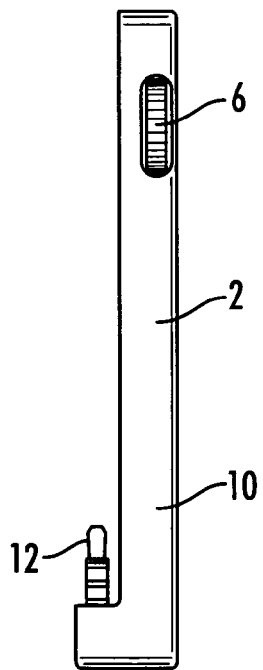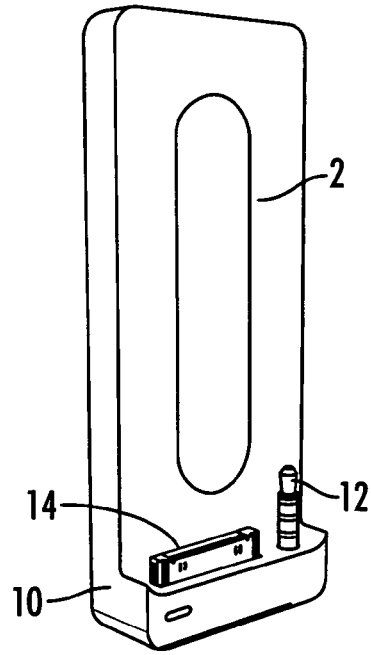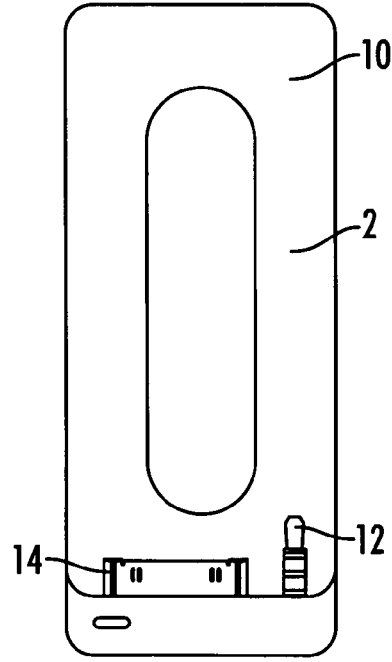
FIG. 2(a)   FIG. 2(b)   FIG. 2(c)

DIGITAL MUSIC PLAYER ACCESSORY INTERFACE

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

Digital music players such as the Apple iPod™ are known which allow a manufacturer's logo from an attached accessory to be displayed on a display screen of the digital music player. This logo is transferred to the digital music player in the form of a static data file which is displayed on the digital music player's screen. While this feature is beneficial to manufacturers of digital music player accessories for advertising and marketing reasons, it does not provide any additional functionality to the digital music player or the accessory. Unfortunately, these prior art digital music player accessories can not transmit dynamic data or display interactive screens on the music player's display. Therefore, what is needed is an improved accessory for a digital music player with a display screen which can display dynamic, interactive information on the display screen of the digital music player.

BRIEF SUMMARY OF THE INVENTION

An embodiment of the present invention is directed toward an accessory for coupling with a digital music player having a display screen. The accessory includes an FM transmitter for transmitting an audio signal from the digital music player to an FM receiver. A user interface, such as a multi-position toggle switch, allows a user to select a frequency for the FM transmitter. The user interface also preferably allows a user to manipulate a menu displayed on the display screen of the digital music player such that the user can select between one of a number of options, such as a broadcast frequency of the digital music player, displayed on the screen. A microcontroller generates a display file such as a bitmap in accordance with a digital music player format based upon the selected frequency. A digital music player interface transfers the display file to the digital music player such that an image corresponding to the display file is displayed on the display screen of the digital music player. The housing of the accessory is designed to be physically coupled to a housing of the digital music player such that the digital music player is mounted to the accessory. The housing includes a piece of adhesive material for firmly securing the accessory housing to the digital music player housing. The accessory is a parasitic device that obtains power from the digital music player.

Another embodiment of the present invention is directed toward an accessory for use with a digital music player wherein the digital music player includes a display screen and is configured to receive and display a static image file from the accessory. The accessory includes an FM transmitter for transmitting an audio signal as a frequency modulated signal. A set of user inputs allow a user to select a transmission frequency for the FM transmitter. A microcontroller configures the transmitter to transmit at the selected frequency and generates an image data file based upon the selected transmission frequency. The microcontroller also preferably generates image files for display on the digital music player display such that the user inputs can be used to manipulate a menu displayed on the display of the digital music player. The microcontroller accomplishes this by generating a new image file for transfer to the digital music player when the user inputs on the accessory are manipulated. The accessory includes a coupling that is adapted to couple with the digital music player such that the image file can be transferred from the accessory to the digital music player. The selected transmission frequency is then displayed on the display of the digital music player. The accessory has a micro material pad on its housing that helps secure the digital music player to the accessory. The housing of the accessory is configured to physically couple to the housing of the digital music player.

Yet another embodiment of the present invention is directed toward a method of displaying dynamic images generated by an accessory on the screen of a digital music player. The digital music player is adapted to display a static image based upon data stored in a static image memory or storage. The accessory is adapted to be physically and electrically coupled to the digital music player. In accordance with the method, an image file is generated in the accessory based upon a desired image to be displayed on the screen of the digital music player. The image file is transferred to the digital music player such that an image based upon the image file is displayed on the screen. A second image file is generated based upon a desired image to be displayed on the screen in response to a user input being manipulated on the accessory. The second image file is transferred to the digital music player such that an image based upon the second image file is displayed on the screen. Preferably, an image corresponding to a menu having a number of user selections is generated with the accessory and the menu image is transmitted to the digital music player. The menu image is displayed on the screen and a user input on the accessory is monitored to determine which of the user selections displayed is selected by the user.

BRIEF DESCRIPTION OF THE SEVERAL VIEWS OF THE DRAWINGS

FIGS. 1(A-C) are respectively a side, perspective and frontal view illustration of an embodiment of the present invention coupled to an iPod Nano™;

FIGS. 2(A-C) are respectively a side, perspective and frontal view illustration of an embodiment of the present invention that is not coupled to an iPod Nano™;

DETAILED DESCRIPTION OF THE INVENTION

Figure 3:
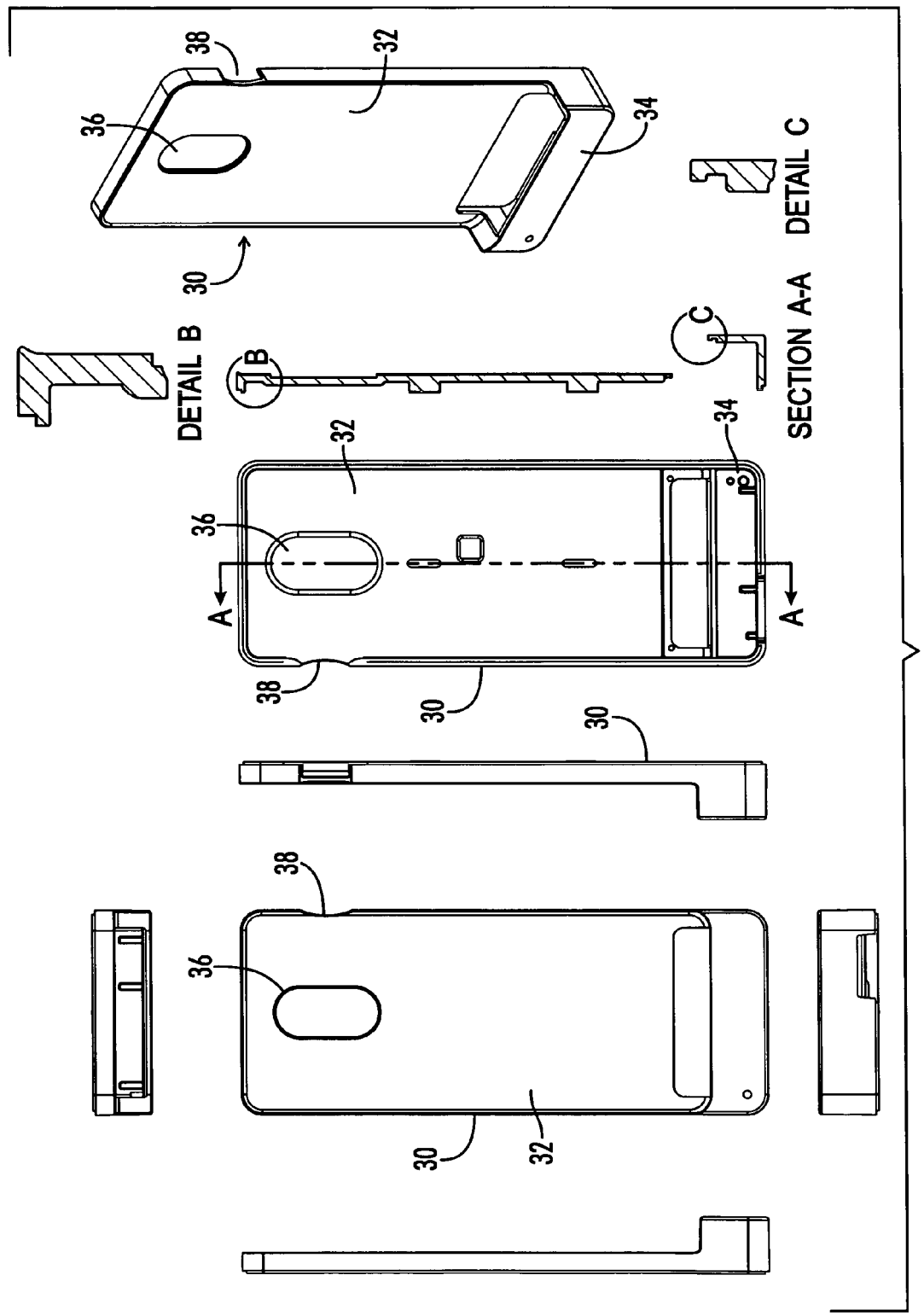
FIG. 3 is a detailed mechanical illustration of a front case half constructed in accordance with an embodiment of the present invention.

An embodiment of the present invention is directed toward a method of using the high resolution LCD on a portable music player, i.e. an Apple iPod™, to display dynamic information and images sent to it by an accessory such as an FM transmitter. Previously, only non-interactive, static data files such as product logos were transferred from an accessory to a digital music player. However, an accessory constructed in accordance with an embodiment of the present invention controls the static image data file and receives inputs from a user interface such that one can write to the digital music player screen when making a station selection or menu preference change. This allows a user to navigate and display information and then return to a normal use mode when done.

Referring now to FIGS. 1(a-c), side (a), perspective (b) and frontal view (c) illustrations of an embodiment of the present invention coupled to an iPod Nano™ are shown. The accessory 2 is an FM transmitter that is designed to mate with a digital music player 4 such that an audio signal received by the accessory 2 from the digital music player 4 can be broadcast to an external FM receiver such as a car radio or home radio. The accessory 2 has sled shaped housing 10 that is designed to be coupled with the digital music player such that the accessory and the digital music player function, and can be carried, as a single unit. In the preferred embodiment shown in FIG. 1, the iPod Nano™ slides into the iTrip™ accessory and securely connects via the iPod's dock and headphone connectors. The iTrip™ accomplishes all this without adding bulk to the slim iPod Nano™.

A user input 6 such as a three position toggle switch 6 is provided on the accessory to allow a user to select an FM frequency on which to broadcast the audio signal received from the digital music player 4. In addition, the toggle switch 6 allows the user to manipulate menus displayed on a video screen 8 of the digital music player 4 that is coupled to the FM transmitting accessory 2. By selecting the proper menus, digital music player functions, such as the volume, operating mode, display, etc., can be controlled through manipulation of the toggle switch 6. While a toggle switch is shown on the embodiment of FIGS. 1 and 2, it will be readily appreciated by those skilled in the art that any suitable user interface 6 could be used. In the embodiment shown, an USB connector 12 and 30 pin connector 14 are used to electrically and physically couple the accessory 2 to the digital music player. However, it will also be readily appreciated by those skilled in the art that the connectors 12 and 14 on the accessory 2 may be altered to accommodate the connectors on the digital music player 4.

The digital music player 4 is configured to receive a static data file such as a bit map from the accessory 2 that is then stored in an image memory of the digital music player 4 and displayed on the player's screen 8. The digital music player 4 is only configured to display static information received from the accessory 2. However, an accessory 2 constructed in accordance with an embodiment of the present invention has a microprocessor and memory or data storage capacity that allow it to generate new data files based upon a user's manipulation of the toggle switch 6. The accessory then sends a signal to the digital music player 4 that instructs the digital music player 4 to substitute the newly generated data file for the previously transmitted data file. Thus, the accessory 2 can generate a display file that indicates the currently selected transmitter frequency and transmit the data file to the digital music player 4 such that the data file is shown on the display screen of the digital music player 8. In addition, the accessory can generate files that display menus on the screen on the digital music player and allow a user to manipulate the menus through the use of the toggle switch 6.

The accessory can generate image files based upon stored partial image files or simply retrieve complete images from memory or a combination of both. For example, the accessory could generate a "98.5" by retrieving stored files corresponding to "9", "8" and "5" and building a composite image file that corresponds to "98.5". Such a system is beneficial in that it reduces the memory requirements of the accessory. Alternatively, the accessory could simply retrieve an image file corresponding to "98.5", thereby increasing the memory requirements, but decreasing the processing requirements of the accessory.

Referring now to FIG. 3, the front half 30 of a housing for an embodiment of the present invention is shown. The front half of the housing 30 preferably consists of a back portion 32 against which the digital music player rests when it is mounted in the housing 30 and a lower pocket 34 that securely receives the bottom of a digital music player mounted in the housing 30. The lower pocket 34 includes openings for the electrical couplings used to couple the electronics of the FM transmitting accessory to the digital music player. A pad 36 of micro suction material such as produced by Henkel™ is positioned in the middle of the back portion 32 to hold the digital music player against the back portion 32 when it is mounted on the accessory. To form a secure attachment, micro grip technology material uses microscopic structures to provide a secure grip and retain their holding properties for very long periods of time. A side opening 38 is also provided on the back portion 32 such that a user input, such as the toggle switch of FIG. 1, can protrude from the interior of the front half housing 30.

Figure 4:
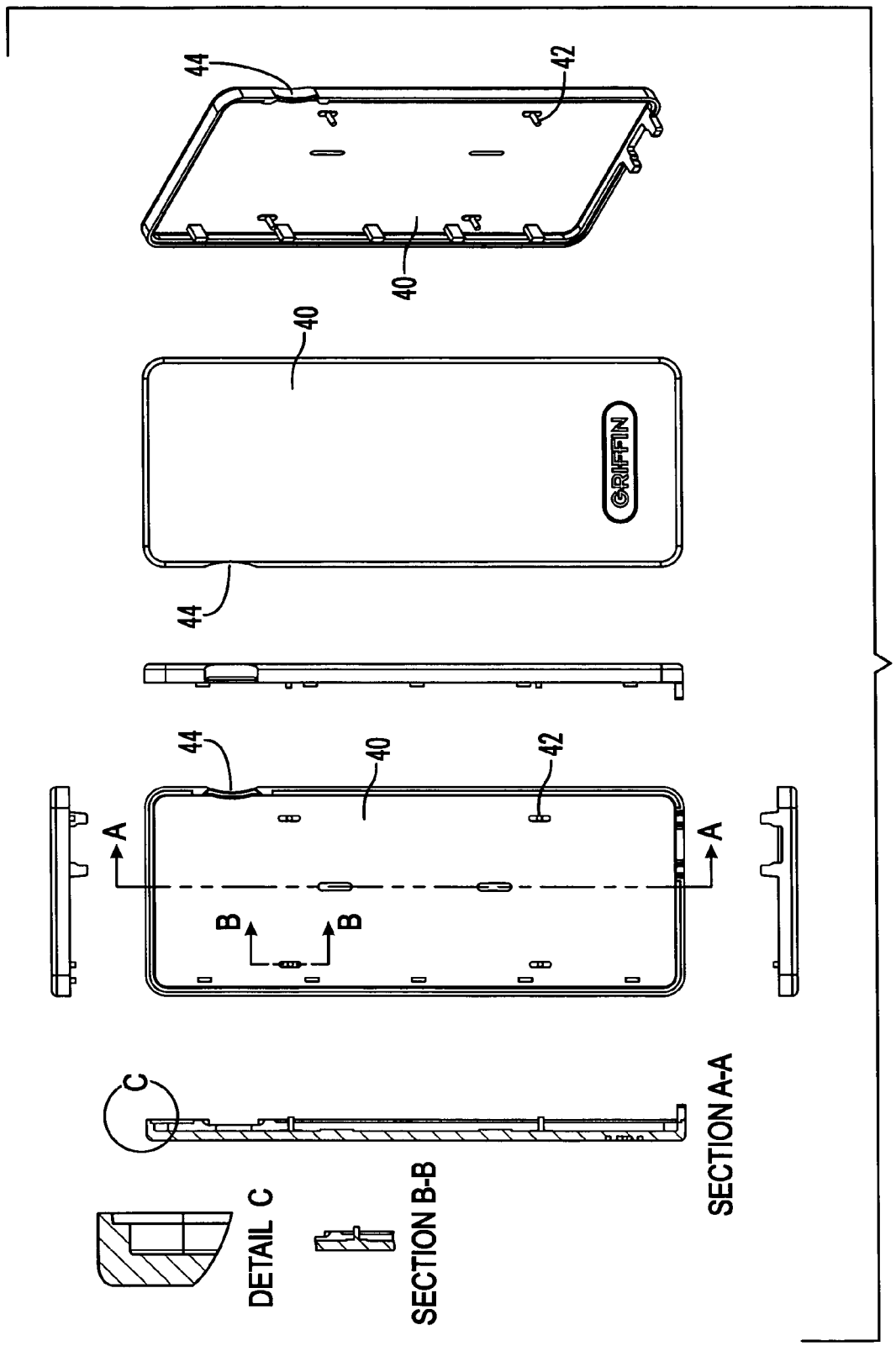
FIG. 4 is a detailed mechanical illustration of a rear case half constructed in accordance with an embodiment of the present invention.

The rear half 40 of the housing 30 shown in FIG. 3 is shown in FIG. 4. The rear half of the housing 40 is essentially a flat back portion that is designed to couple with the front half 30. A series of projections 42 is configured to support the computer board in the housing. An opening 44 in the rear half 40 that allows the toggle switch to protrude from the housings halves 30 and 40 when joined is also provided in the rear half portion 40.

Figure 5:
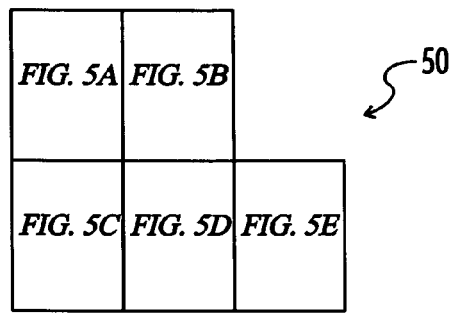
FIG. 5 is a schematic of an FM transmitter for a digital music player constructed in accordance with an embodiment of the present invention.
Figure 5A:
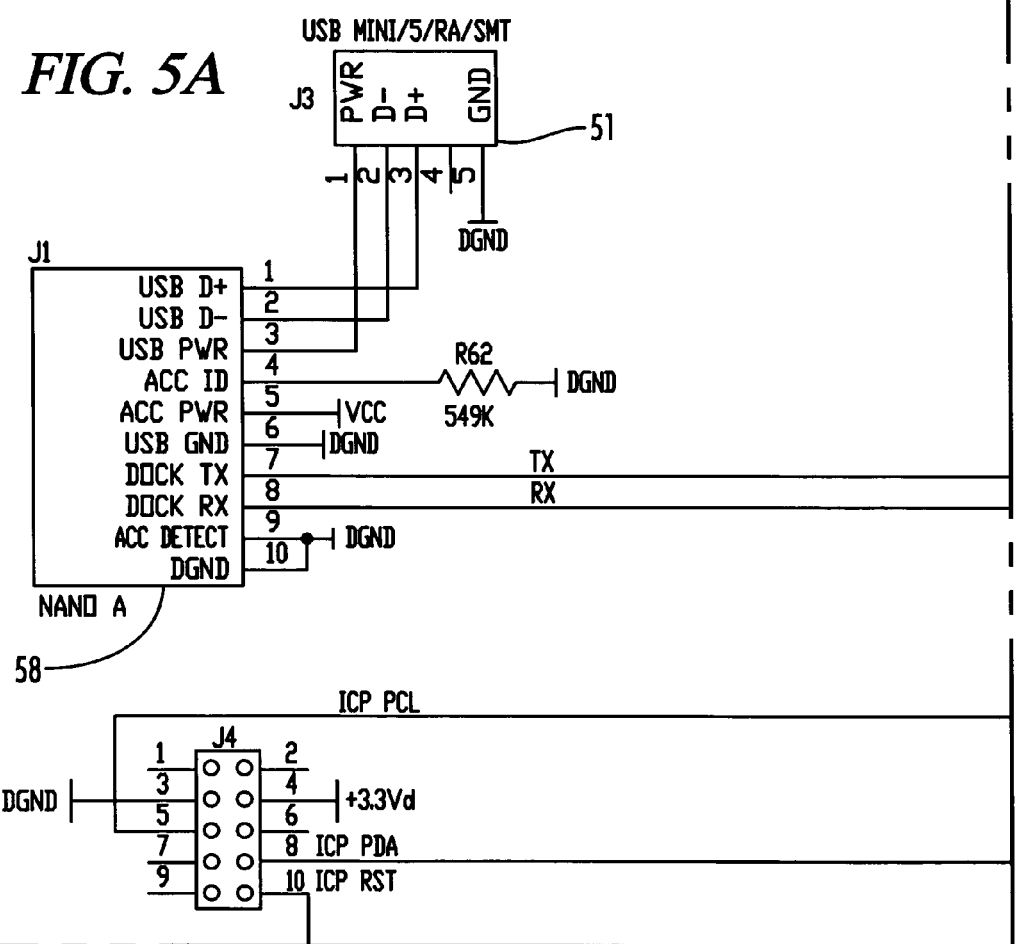
Figure 5B:
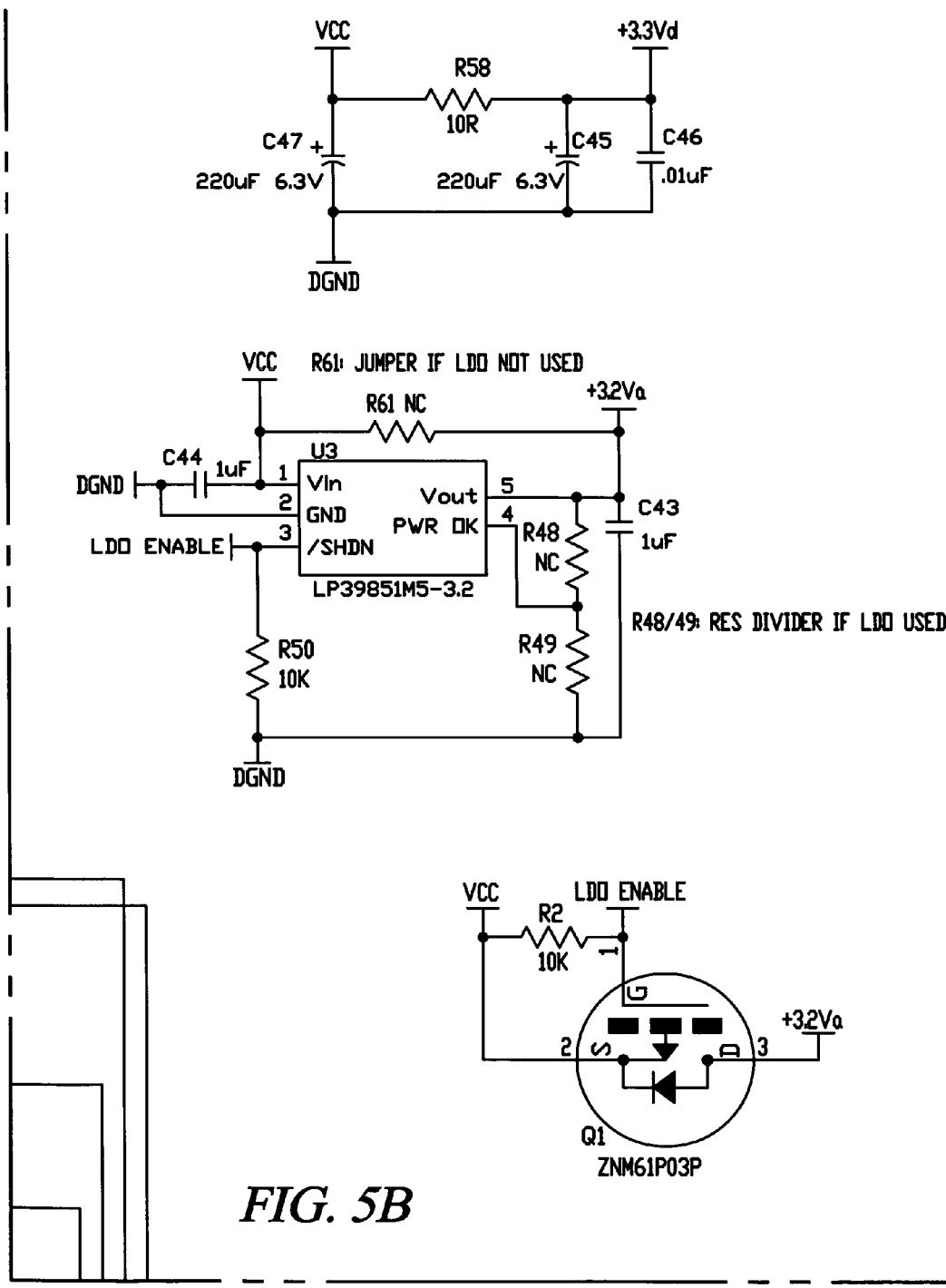
Figure 5C:
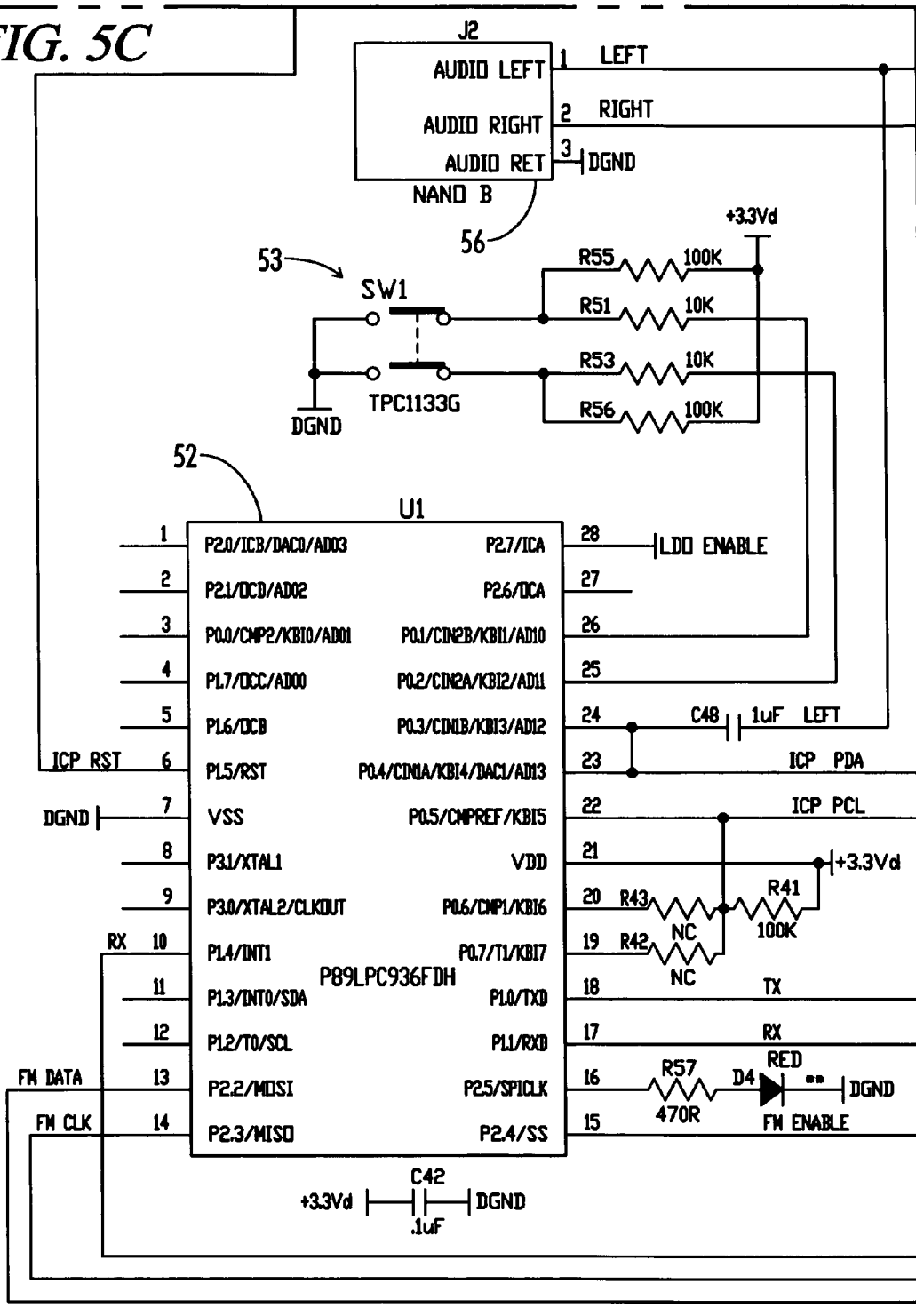
Figure 5D:
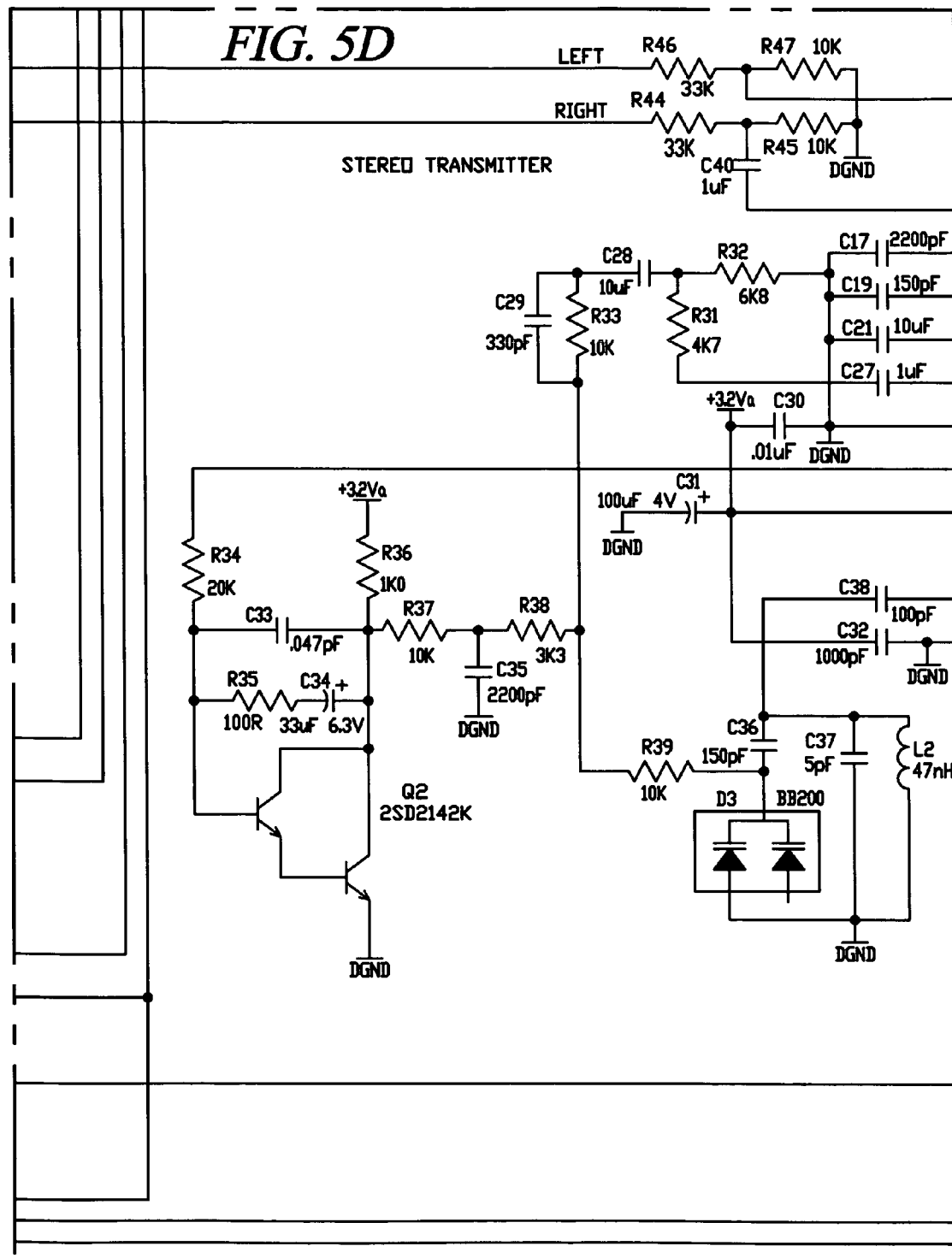
Figure 5E:
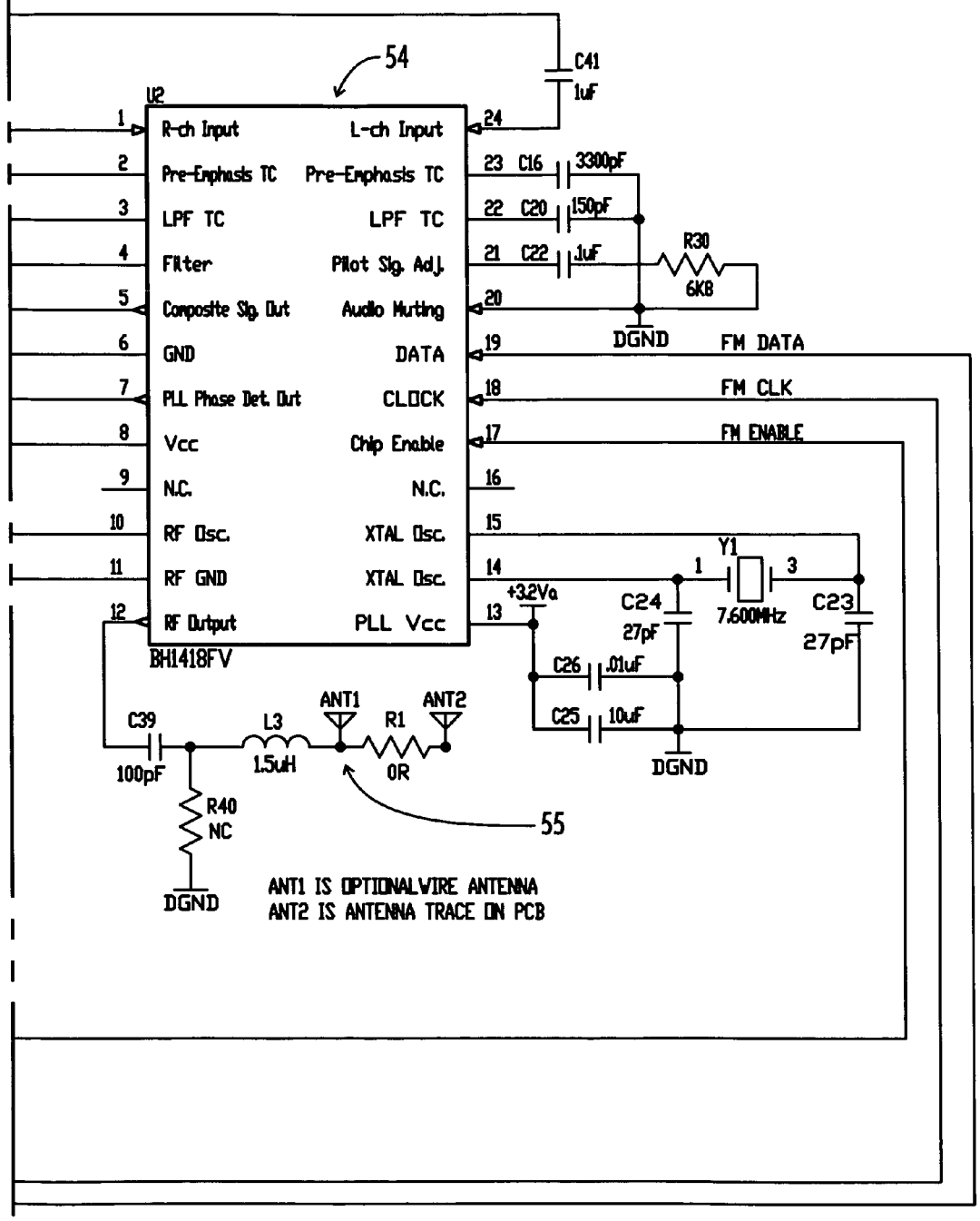

Referring now to FIG. 5, a schematic 50 of the electronics contained in an accessory constructed in accordance with an embodiment of the present invention is shown. The primary electronics contained in the accessory are a microcontroller 52 and an FM transmitter 54. The accessory exchanges information, audio signals and power with the digital music player through a set of ports 56 and 58. The particular accessory shown in FIG. 5 also has a USB port 51 that allows an external device to be coupled through the accessory to the USB port of the digital music player since the accessory covers the USB port of the digital music player. The microcontroller 52 receives and decodes user inputs received from a user input 53 such as the toggle switch shown and discussed with respect to FIG. 1. Depending upon the received inputs from the user input 53, the microcontroller 52 performs one of a number of functions. If the user input corresponds to the selecting of a transmission frequency for the FM transmitter 54, the microcontroller 52 compiles the appropriate codes and sends them to the FM transmitter 54 to instruct the transmitter to alter the frequency being transmitted from the antenna 55. In addition, the microcontroller 52 generates an image data file that is transmitted to the digital music player through a set of transmit pins in ports 58 used to couple the accessory to the digital music player. This image file is transmitted to the digital music player such that it is displayed on a screen of the digital music player as discussed in more detail herein.

Figure 6:
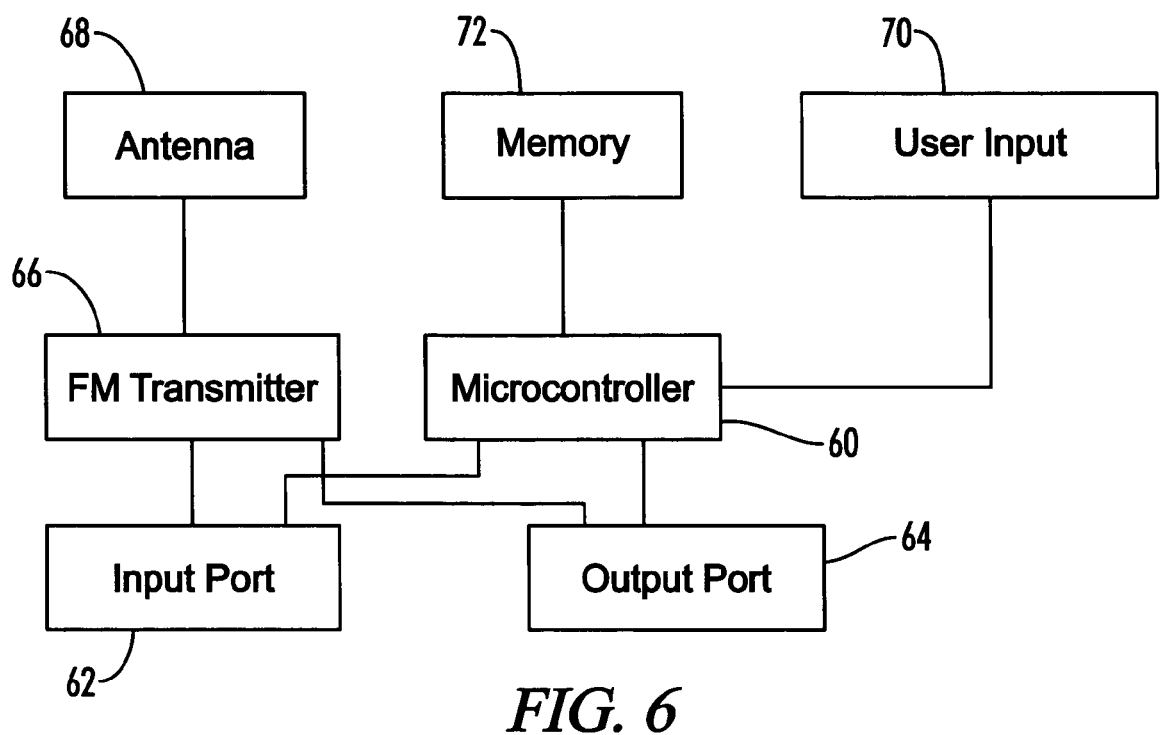
FIG. 6 is a functional diagram of the components of a digital music player accessory constructed in accordance with an embodiment of the present invention.

Referring now to FIG. 6, a functional diagram of the components of the digital music player accessory in accordance with an embodiment of the present invention is shown. The accessory is controlled by a microcontroller 60. The microcontroller 60 communicates with the accessory through an input port 62 and an output port 64. In the embodiment of FIG. 1, the input port 62 and output port 64 are embodied in a USB port and a 30 pin connector. However, those skilled in the art will appreciate that input port 62 and output port 64 can easily be configured to mate with the particular manufacturer's digital music player with which it is desired to accessorize.

The microcontroller 60 also controls the FM transmitter 66 which transmits its signal over an antenna 68. In a preferred embodiment, the FM transmitter 66 is implemented with a ROHM 1418 chip. The antenna 68 may simply be a wire or ground coupled to the FM transmitter 68. The microcontroller 60 alters the transmit frequency of the FM transmitter 68 in response to a user manipulating a user input 70. The accessory also preferably provides selectable mono or stereo modes for the transmitter that allows the user to adjust for the absolute best possible reception under real-world conditions. Stereo mode is enabled for the best audio reproduction when a clear station is available. Mono mode is enabled in congested areas, such as large cities with stations crowding the dial for the best reception. The accessory can also be configured to supports US and International tuning modes and store the most recently used station presets if desired.

The accessory generates, or retrieves from data storage or memory 72, image data files based upon the transmit frequency selected by the user. The image data files are transferred to a display memory in the digital music player such that they are displayed on a screen of the digital music player. When a new frequency is selected with the accessory's user input 70, a new image file is generated by the microcontroller 60 or retrieved from the memory 72 that corresponds to the selected frequency. The new image file is then transferred to the digital music player through the output port 64 such that the display is updated. User interactive menus can also be generated in a similar fashion and displayed such that a user can select a function by manipulating the accessory's user input 70. Although the memory 72 and microcontroller 60 are shown as separate functional units, it will be appreciated by those skilled in the art that they may be embodied in a single computer chip.

The digital accessory is most preferably a parasitic device that takes its power from the digital music player. However, in alternate embodiments, the accessory could contain a battery for charging the digital music player or charging circuitry for producing a desired voltage for the digital music player. A power supply also may simply be coupled to the digital music player through the accessory if desired. The accessory is also preferably configured to allow the digital music player to be charged while it is coupled to the accessory.

Thus, although there have been described particular embodiments of the present invention of a new and useful IMPROVED DIGITAL MUSIC PLAYER ACCESSORY INTERFACE, it is not intended that such references be construed as limitations upon the scope of this invention except as set forth in the following claims.

What is claimed is:

1. An accessory for coupling with a digital music player having a display screen, said accessory comprising:
   a transmitter for transmitting a signal from the digital music player to a remote receiver or a receiver for receiving a signal from a remote transmitter and transferring said signal to said digital music player;
   a user interface that allows a user to select a frequency for the transmitter or receiver and;
   a microcontroller for generating a display file in accordance with a digital music player format based upon the selected frequency; and
   a digital music player interface for transferring the display file to the digital music player such that an image corresponding to the display file is displayed on the display screen of the digital music player.

2. The accessory of claim 1 wherein a housing of the accessory is designed to be physically coupled to a housing of the digital music player such that the digital music player is mounted to the accessory.

3. The accessory of claim 2 wherein said housing includes a piece of adhesive material for firmly securing said accessory housing to said digital music player housing.

4. The accessory of claim 1 wherein the user interface allows a user to manipulate a menu displayed on the video screen of the digital music player such that the user can selected between one of a number of options displayed on said screen.

5. The accessory of claim 1 wherein said user interface is a multi position toggle switch.

6. The accessory of claim 1 wherein said digital music player further comprises a static memory for storing a static image file.

7. The accessory of claim 1 wherein the accessory is a parasitic device that obtains power from the digital music player.

8. The accessory of claim 1 wherein the accessory can control a volume of the digital music player.

9. An accessory for use with a digital music player wherein said digital music player includes a display screen and said digital music player is configured to receive and display a static image file received from the accessory, said accessory comprising:
   an FM transmitter for transmitting an audio signal as a frequency modulated signal;
   a set of user inputs that allow a user to a select a transmission frequency for said FM transmitter;
   a microcontroller for configuring said transmitter to transmit at said selected frequency and generating an image data file based upon said selected transmission frequency; and
   a coupling for coupling said accessory to said digital music player such that said image file can be transferred from said accessory to said digital music player such that said selected transmission frequency is displayed on said display of said digital music player.

10. The accessory of claim 9 wherein said microcontroller generates image files for display on said digital music player display such that said user inputs can be used to manipulate a menu displayed on said display of said digital music player.

11. The accessory of claim 9 wherein said microcontroller generates a new image file for transmission to said digital music player when said user inputs on said accessory are manipulated.

12. The accessory of claim 9 further comprising adhesive pad on a housing for helping secure said digital music player to said accessory.

13. The accessory of claim 9 further comprising a housing configured to physically couple to a housing of said digital music player.

14. The accessory of claim 9 wherein said set of user inputs further comprises includes a multi position toggle switch.

15. A method of displaying dynamic images generated by an accessory on a screen of a digital music player wherein said digital music player is adapted to display a static image based upon data stored in a static image memory; wherein said accessory is an FM transmitter designed to be coupled to said digital music player such that an audio signal from said digital music player is broadcast by said accessory and wherein said data bits correspond to a transmission frequency of said accessory; said method: generating a series of data bits in said accessory based upon a desired image to be displayed on said screen; transferring said data bits to said digital music player such that an image based upon said data bits is displayed on said screen; generating a series of data bits based upon a desired image to be displayed on said screen in response to a user input being manipulated on said accessory; and transferring said series of data bits to said digital music player such that an image based upon said second series of data bits is displayed on said screen.

16. The method of claim 15 further comprising generating an image corresponding to a menu having a number of user selections with said accessory, transferring said menu image to said digital music player, displaying said menu image on said screen, and monitoring a user input on said accessory to determine which of said user selections is selected by said user.

17. The method of claim 15 further comprising providing a toggle switch as user input for said accessory.

18. The method of claim 15 wherein said accessory is adapted to be physically and electrically coupled to said digital music player.

19. The method of claim 15 wherein said accessory has an adhesive pad that aids in securing said accessory to said digital music player.

* * * * *